United States Patent

[11] 3,621,077

| [72] | Inventor | Frank J. Donat<br>Mantua, Ohio |
|---|---|---|
| [21] | Appl. No. | 772,859 |
| [22] | Filed | Nov. 1, 1968 |
| [45] | Patented | Nov. 16, 1971 |
| [73] | Assignee | The B.F. Goodrich Company<br>New York, N.Y. |

[54] SOLVENT RESISTANT THERMOPLASTIC POLYMERS
9 Claims, No Drawings

| [52] | U.S. Cl. | 260/879, 260/880 |
|---|---|---|
| [51] | Int. Cl. | C08f 15/40 |
| [50] | Field of Search | 260/879, 880 |

[56] References Cited
UNITED STATES PATENTS

| 3,373,227 | 3/1968 | Finestone et al. | 260/880 |
|---|---|---|---|
| 3,442,981 | 5/1969 | Stafford et al. | 260/880 |
| 3,459,832 | 8/1969 | Kern | 260/881 |

*Primary Examiner*—Joseph L. Schofer
*Assistant Examiner*—R. A. Gaither
*Attorneys*—J. Hughes Powell, Jr. and Ernest K. Bean ABSTRACT: Solvent resistant thermoplastic rubbery compositions which have a good balance of low temperature properties have been prepared. The present compositions are three-block polymers obtained by the sequential polymeization of a vinyl-substituted aromatic hydrocarbon monomer, a conjugated diene monomer and a $\alpha,\beta$-olefinically unsaturated nitrile monomer.

SOLVENT RESISTANT THERMOPLASTIC POLYMERS

BACKGROUND OF THE INVENTION

Rubbers having a good balance of low-temperature properties and are resistant to the action of hydrocarbon solvents are useful in many applications. Gasoline and hydraulic hose, for example, must maintain their flexibility and strength at low temperatures and also be resistant to hydrocarbon fuels. By copolymerizing butadiene with varying amounts of acrylonitrile, solvent resistant rubbers which are also flexible at low temperatures have been obtained. In order to achieve useful rubber properties with these butadiene-acrylonitrile copolymers, however, it is necessary to vulcanize the rubbers with sulfur, tetramethylthiuram disulfide or the like.

It would be useful to prepare a thermoplastic rubber which when unvulcanized has a good balance of general physical properties, low-temperature flexibility and resistance to hydrocarbon solvents.

SUMMARY OF THE INVENTION

This invention provides thermoplastic rubbery polymers, which in an unvulcanized state, have useful physical properties, are resistant toward the action of hydrocarbon solvents and retain their flexibility at low temperatures. The polymers of this invention are three component block copolymers. The monomers employed to make up the polymer blocks are, in order of their polymerization, vinyl-substituted aromatic hydrocarbons, preferably styrene; conjugated dienes, preferably 1,3-butadiene or isoprene; and an $\alpha,\beta$-olefinically unsaturated nitrile, preferably acrylonitrile or methacrylonitrile. The vinyl-substituted aromatic hydrocarbon comprises about 15 percent to 40 percent by weight of the total polymer, the conjugated diene about 35 percent to 80 percent by weight of the total polymer and the $\alpha,\beta$-olefinically unsaturated nitrile about 5 to 35 percent by weight of the total polymer. In order to obtain useful polymers the molecular weight of the individual polymer components must be maintained within certain limits. The molecular weight will range between about 2,000 and 50,000 for the vinyl-substituted aromatic hydrocarbon component, from about 15,000 to about 150,000 for the conjugated diene polymer component and from about 3,000 to 50,000 for the terminating $\alpha,\beta$-olefinically unsaturated nitrile component.

The process for preparing the three component block polymers of this invention consists of sequentially polymerizing the individual monomers with an organolithium catalyst in a hydrocarbon solvent. However, to achieve polymers having the desired composition and molecular weight ranges of the individual polymer components, especially the acrylonitrile or methacrylonitrile block, the amount of initiator employed must be maintained within carefully controlled limits. The amount of initiator employed in conducting the polymerization will be such that for the final polymerization step, that is, forming the $\alpha,\beta$-olefinically unsaturated nitrile polymer block, about 0.5 to 20 milligrams initiator per gram $\alpha,\beta$-olefinically unsaturated nitrile will be present. To achieve efficient polymerization at these initiator levels, the temperature of polymerization must be maintained between about +10° and −100° C.

DETAILED DESCRIPTION

The thermoplastic rubbers of this invention are comprised of three discrete polymer blocks obtained by sequential polymerization of a vinyl-substituted aromatic hydrocarbon, a conjugated diene and an $\alpha,\beta$-olefinically unsaturated nitrile. Preferred three-block polymers are comprised of a styrene block, butadiene or isoprene block and an acrylonitrile or methacrylonitrile block.

The initial vinyl-substituted aromatic hydrocarbon block comprises about 15 to 40 percent by weight of the total polymer, more preferably about 20 to 35 percent, and has a molecular weight ranging between about 2,000 and 50,000 and more preferably 5,000 to 40,000. Although styrene is the preferred monomer for the preparation of the first polymer block, other vinyl-substituted aromatic hydrocarbon monomers such as $\alpha$-methyl styrene, t-butyl styrene, vinyl toluene, vinyl xylene, dichlorostyrene or the like may be employed.

1,3-Butadiene or isoprene are preferably the monomers employed to form the second block component, however, other conjugated dienes may also be used. The amount of conjugated diene employed will range from about 35 to 80 percent by weight of the total polymer. Typically, about 50 to 75 percent by weight butadiene or isoprene will be used. The molecular weight of the conjugated diene block will range between about 15,000 and 150,000, however, it is more preferable that the molecular weight be between 20,000 and 100,000. Other conjugated 1,3-dienes which may be employed to form this second polymer block, either by themselves or in combination with the butadiene or isoprene include chloroprene, piperylene and the like.

The formation of the vinyl-substituted aromatic hydrocarbon and conjugated diene blocks is accomplished using conventional polymerization techniques which are well known to the art. The polymerization is initiated with organolithium compounds of the formula R-Li wherein R is an aliphatic, aromatic or cycloaliphatic hydrocarbon radical containing from one to 12 carbon atoms. Typical organolithium compounds employed will be methyllithium, isobutyllithium, n-butyllithium, sec-butyllithium, t-octyllithium, n-decyllithium, phenyllithium, naphthyllithium, 4-butylphenyllithium, p-tolyllithium, 4-phenylbutyllithium, cyclohexyllithium, 4-butylcyclohexyllithium, and the like.

In carrying out the polymerizations the initiators will typically be employed in a solvent medium consisting of aromatic, paraffinic or cycloparaffinic hydrocarbons. Useful hydrocarbon solvents include propane, isobutane, n-pentene, isooctane, cyclopentane, cyclohexane, benzene, toluene, xylene or the like. The temperatures employed for forming the vinyl-substituted aromatic hydrocarbon blocks and conjugated diene blocks will range between about 20° to 100° C. Best results are obtained in forming the vinyl-substituted aromatic hydrocarbon polymer block when the polymerization temperature is between about 20° to 60° C. When forming the conjugated diene block component a temperature of 30° to 50° C. is generally preferred.

The initial vinyl-substituted aromatic hydrocarbon polymer block is formed by reacting the monomer with the organolithium initiator in hydrocarbon solvent until substantially all of the styrene has been polymerized. Generally, the amount of unreacted vinyl-substituted aromatic hydro carbon monomer remaining should not exceed about 10 percent. Best results are obtained when 95 percent or higher of the monomer has been polymerized. The amount of organolithium initiator employed to achieve polymerization of the vinyl-substituted aromatic hycrocarbon monomer will range between about 0.1 to 15 milligrams per gram monomer charged and more preferably between 0,5 and 10 milligrams per gram of monomer charged. After the polymerization of the vinyl-substituted aromatic hydrocarbon monomer has proceeded to essential completion, the conjugated diene is charged to the polymerizer. The polymerization temperature will be varied accordingly and the polymerization conducted for the time required to insure substantially complete conversion of the conjugated diene.

In forming the vinyl-substituted aromatic hydrocarbon polymer block and the conjugated diene polymer block, it is essential that a "living" polymer be maintained. Impurities such as oxygen, air, water, alcohols and the like must therefor be excluded from the polymerizer since their presence would serve to terminate the growing polymer chains.

The final or terminal block component of the present three-block polymers is comprised of an $\alpha,\beta$-olefinically unsaturated nitrile. Typically, the amount of the $\alpha,\beta$-olefinically unsaturated nitrile will be about 5 to 35 percent by weight of the total polymer composition with a molecular weight ranging from about 3,000 to 50,000. It is more preferable that the terminating polymer block be comprised of about 6.5 to 25 percent by weight based on the total polymer of acrylonitrile or methacrylonitrile polymerized and that the molecular weight of the acrylonitrile or methacrylonitrile block be between about 5,000 and 40,000.

To achieve efficient polymerization of the $\alpha,\beta$-olefinically unsaturated nitrile monomer to form the final polymer block within the limits set out above it is necessary that the process be conducted at a temperature between about 10° and −100° C., preferably between about −10° C. and −80° C., and that the initiator concentration be carefully maintained within specific limits. The amount of $\alpha,\beta$-olefinically unsaturated nitrile monomer charged will be determined based on the amount of initiator charged at the outset of the polymerization. Generally, enough acrylonitrile or methacrylonitrile will be charged so that 0.5 to 20 milligrams initiator per gram nitrile monomer will be present. Excellent results have been achieved operating at 1 to 15 milligrams initiator per gram $\alpha,\beta$-olefinically unsaturated nitrile monomer.

To obtain thermoplastic polymers which are resistant to solvents and have excellent low-temperature properties, the three-block polymer systems, poly(styrene)-poly(butadiene or isoprene)-poly(acrylonitrile or methacrylonitrile), are desirable. The present process, particularly for forming the final polymer block, can also be advantageously employed with other difficultly polymerizable (with the present catalyst system) polar monomers to prepare other useful polymers. Particularly useful compositions obtainable using the above-described process are poly(styrene)-poly(butadiene or isoprene)-poly(acrylic ester) block polymers. Acrylic esters, that is, alkyl acrylates and methacrylates, such as ethyl acrylate, n-butyl acrylate, 2-ethylhexyl acrylate, methyl methacrylate, ethyl methacrylate can be employed.

The recovery of the block polymers may be achieved by any of the conventional techniques. Typically, when the polymerization of the final block segment is complete a terminating agent material such as water, methanol, ethanol, or the like will be added in sufficient quantity to terminate the reaction. If desired, larger quantities may be added so that the polymer will be precipitated from the solution at the same time. It is often most convenient to add the inactivating material in quantities sufficient to terminate the polymerization but not precipitate the polymer and then add a stabilizing amount of a material such as phenyl-$\beta$-naphthylamine, 4-methyl-2,6-di-t-butylcresol or the like prior to the precipitation of the polymer.

The block polymers of the present invention do not require vulcanization to achieve a good balance of low-temperature properties and resistance to hydrocarbon solvents. The polymers may be cured, however, if desired. Conventional curing techniques such as with sulfur and sulfur-containing materials or other cross-linking agents such as peroxides can be employed. Likewise, the present block polymers can be compounded with fillers, lubricating agents, pigments, antioxidants, antiozonants or other conventional compounding ingredients as dictated by the ultimate end use of the rubber. The present thermoplastic rubbers may also be reinforced by blending with plastic materials such as polystyrene, or it may be extended with oils.

The rubbery polymers of the present invention are useful for a wide variety of applications where low-temperature properties, solvent resistance and ready processability are desirable. The polymers may be molded or extruded into a variety of shaped products. Shoe soles, weather seals, tubing and hose constitute useful applications for these thermoplastic rubbers. Solutions of these polymers can be used to impregnate fabrics to obtain useful gasket compositions.

The following examples serve to illustrate the invention more clearly. All parts and percentages are on a weight basis unless otherwise indicated.

EXAMPLE I

A styrene-butadiene-acrylonitrile block copolymer was prepared in accordance with the present invention. About 500 grams toluene, 19 grams styrene and 0.0612 gram of n-butyl lithium were charged to a pressure reactor. The reactor and its contents were tumbled at 45° C. until substantially all the styrene had polymerized (3 hours). The temperature of the reactor was lowered to 35° C. and 53 grams of butadiene charged followed by 18 hours of tumbling to achieve substantial complete conversion of the butadiene. The reactor and its contents were then cooled to −20° C. and 28 grams acrylonitrile charged. After 4 hours at −20° C., the polymerization was terminated by the addition of 5 ml. methanol. Prior to precipitation of the styrene-butadiene-acrylonitrile polymer with excess ethanol 10 ml. of saturated solution of 4-methyl-2,6-di-t-butylcresol in ethanol were added. The polymer was dried under vacuum and upon analysis found to contain 23 percent styrene, 64 percent butadiene and 13 acrylonitrile.

TABLE I

| | |
|---|---|
| Tensile Strength (p.s.i.)* | 575 |
| Elongation (%)* | 500 |
| 300% Modulus* | 433 |
| Tensile Strength (p.s.i.)** | 368 |
| Elongation (%)** | 300 |
| 300% Modulus** | 368 |
| Oil Swell (No. 1 Oil)—ASTM D-471 | |
| % Increased Volume | 194 |
| % Increased Weight | 177 |
| Gehman Freeze (°C.) ASTM D-1053 | |
| $T_f$ | −92 |

*Determined at room temperature

**Determined at 50° C.

The molecular weight of the acrylonitrile block was about 13,400. This is determined from the formula $$\text{Percent bound acrylonitrile} \times \frac{\text{mol. wt. initiator}}{\text{grams initiator}} = \text{mol. wt. acrylonitrile block}$$

In effect, the molecular weight of the acrylonitrile block provides a measure of the efficiency of the present process for polymerizing the difficulty polymerizable acrylonitrile monomer. The physical properties, of the styrene-butadiene-acrylonitrile polymer were determined and are set forth in table I.

When a styrene-butadiene-acrylonitrile polymer was prepared employing the identical procedure and charges as described above, except that the polymerization temperature for forming the acrylonitrile block was 30° C., the resulting polymer properties were significantly lower than obtained with polymers of the present invention. This polymer also had poorer low-temperature properties and was less resistance to ASTM No. 1 oil. At this elevated polymerization temperature, the amount of acrylonitrile polymerized and also the molecular weight of the acrylonitrile block was much lower than with the process of the present invention. Increasing the amount of catalyst when conducting polymerizations at elevated temperatures did not produce any significant improvement in the polymer properties.

EXAMPLE II 21 grams styrene was polymerized at 45° C. employing 0.08 gram n-butyl lithium in about 500 grams toluene. After 3 hours 55 grams 1,3-butadiene was charged to the polymerizer and allowed to react at 35° C. until substantially all the butadiene was polymerized. The temperature of the reactor was then lowered to −78° C. and 34 grams methacrylonitrile is 33 grams toluene charged. After 5 hours the reaction was terminated and the styrene-butadiene-methacrylonitrile polymer coagulated. Analysis of the polymer determined the composition to be 22.8 percent styrene, 63.5 percent butadiene and 14.7 percent methacrylonitrile. The methacrylonitrile block had a molecular weight of approximately 11,000.

EXAMPLE III

A series of styrene-butadiene-acrylonitrile block copolymer compositions were prepared following the procedure described in example I. The styrene polymerization was conducted at 45° C. for about 3 hours and the butadiene polymerized for about 18 hours at 35° C. Table II sets forth the various runs and lists the amount of monomers charged, the amount of initiator employed, the polymerization temperature for forming the acrylonitrile block, the composition of the block polymer and the molecular weight of the acrylonitrile block component. These thermoplastic polymers all had excellent physical properties in an uncured state. They retained their flexibility even at temperatures below −70° C. and showed a high degree of resistance to ASTM No. 1 oil. Other three-block polymers were prepared with varying styrene and butadiene levels.

butadiene or isoprene is about 50 to 75 percent by weight, and the amount of the acrylonitrile or methacrylonitrile is about 6.5 to 25 percent by weight.

4. A thermoplastic three-block polymer composition of claim 3 wherein the molecular weight of the styrene block is about 5,000 to 40,000, the molecular weight of the 1,3-butadiene or isoprene block is about 20,000 to 100,000 and the molecular weight of the acrylonitrile or methacrylonitrile block is about 5,000 to 40,000.

5. A process for preparing a thermoplastic three-block polymer composition which comprises (a) reacting a vinyl-substituted aromatic hydrocarbon monomer in an inert hydrocarbon solvent and at a temperature between about 20° and 100° C. with about 0.1 to 15 milligrams per gram vinyl-substituted aromatic hydrocarbon monomer of an organolithium compound of the formula R-Li wherein R is an aliphatic, aromatic or cycloaliphatic hydrocarbon radical containing from one to 12 carbon atoms, until substantially all the monomer has polymerized; (b) adding to this reaction mixture a conjugated diene monomer and reacting until substantially complete conversion of the conjugated diene monomer; and (c) lowering the temperature of the reactor to about 10° to −100° C., charging an $\alpha,\beta$-olefinically unsaturated nitrile monomer so that 0.5 to 20 milligrams initiator per gram nitrile monomer is present and maintaining the polymerization tem-

TABLE II

| Run No. | Weight monomers charged (grams) | | | Milligrams initiator | Acrylonitrile, polymerization temp. (° C.) | Polymer Composition percent | | | Acrylonitrile block, molecular weight |
|---|---|---|---|---|---|---|---|---|---|
| | Styrene | Butadiene | Acrylonitrile | | | Styrene | Butadiene | Acrylonitrile | |
| 1 | 21 | 55 | 24 | 61.2 | 0 | 25 | 67 | 8 | 8,200 |
| 2 | 20 | 51 | 29 | 61.2 | −10 | 25 | 64 | 11 | 11,300 |
| 3 | 18.5 | 52 | 29.5 | 132.2 | −20 | 20 | 57 | 23 | 8,860 |
| 4 | 17 | 53 | 30 | 61.2 | −40 | 20 | 61 | 19 | 19,600 |
| 5 | 16 | 47 | 20.5 | 81.6 | −78 | 21.6 | 63.5 | 14.9 | 11,500 |

The above examples clearly demonstrate the ability to prepare three-block thermoplastic polymer compositions having excellent physical properties in an uncured state, low-temperature flexibility and resistance to hydrocarbon solvents. They also show the ability to prepare polymer compositions having a high-bound acrylonitrile or methacrylonitrile content at low temperatures and with high catalyst efficiencies.

I claim:

1. A thermoplastic three-block polymer composition comprising about 15 to 40 percent by weight based on the total polymer of a vinyl-substituted aromatic hydrocarbon monomer, about 35 to 80 percent by weight of a conjugated diene, and about 5 to 35 percent by weight of an $\alpha,\beta$-olefinically unsaturated nitrile, sequentially polymerized, wherein the vinyl-substituted aromatic hydrocarbon polymer block is essentially homopolymeric and has a molecular weight of about 2,000 to 50,000, the conjugated diene polymer block is essentially homopolymeric and has a molecular weight of about 15,000 to 150,000 and the $\alpha,\beta$-olefinically unsaturated nitrile polymer block is essentially homopolymeric and has a molecular weight of about 4,000 to 50,000.

2. A thermoplastic three-block polymer composition of claim 1 wherein the vinyl-substituted aromatic hydrocarbon is styrene, the conjugated diene is selected from the group consisting of 1,3-butadiene or isoprene, and the $\alpha,\beta$-olefinically unsaturated nitrile is selected from the group consisting of acrylonitrile or methacrylonitrile.

3. A thermoplastic three-block polymer composition of claim 2 wherein the amount of styrene is about 20 to 35 percent by weight based on the total polymer, the amount of 1,3 perature between about 10° and −100° C. until the desired degree of polymerization has been achieved.

6. The process for preparing a thermoplastic three-block polymer composition of claim 5 wherein the vinyl-substituted aromatic hydrocarbon monomer is styrene, the conjugated diene monomer is selected from the group consisting of 1,3-butadiene or isoprene, and the $\alpha,\beta$-olefinically unsaturated nitrile monomer is selected from the group consisting of acrylonitrile or methacrylonitrile.

7. The process for preparing a thermoplastic three-block polymer composition of claim 5 wherein the amount of organolithium initiator employed in step (a) is about 0.5 to 10 milligrams per gram of vinyl-substituted aromatic hydrocarbon monomer charged, the temperature of polymerization of step (a) is about 20° to 60° C. and the temperature of polymerization of step (b) is about 30° to 50° C.

8. The process for preparing a thermoplastic three-block polymer composition of claim 7 wherein the polymerization temperature of step (c) is between about −10° and 80° C. and the $\alpha,\beta$-olefinically unsaturated nitrile monomer is charged so that about 1 to 15 milligrams organolithium initiator per gram $\alpha,\beta$-olefinically unsaturated nitrile monomer is present.

9. The process is for preparing a thermoplastic three-block polymer composition of claim 8 wherein the vinyl-substituted aromatic hydrocarbon monomer is styrene, the conjugated diene monomer is selected from the group consisting of 1,3-butadiene or isoprene, and the $\alpha,\beta$-olefinically unsaturated nitrile monomer is selected from the group consisting of acrylonitrile or methacrylonitrile.

* * * * *